(12) United States Patent
Wu et al.

(10) Patent No.: US 11,983,966 B2
(45) Date of Patent: *May 14, 2024

(54) METHOD, SYSTEM AND RELATED DEVICES FOR IMPLEMENTING VEHICLE AUTOMATICALLY PASSING THROUGH BARRIER

(71) Applicant: Beijing Tusen Weilai Technology Co., Ltd., Beijing (CN)

(72) Inventors: Nan Wu, Beijing (CN); He Zheng, Beijing (CN)

(73) Assignee: BEIJING TUSEN WEILAI TECHNOLOGY CO., LTD., Beijing (CN)

(*) Notice: Subject to any disclaimer, the term of this patent is extended or adjusted under 35 U.S.C. 154(b) by 21 days.

This patent is subject to a terminal disclaimer.

(21) Appl. No.: 17/859,935

(22) Filed: Jul. 7, 2022

(65) Prior Publication Data
US 2022/0343694 A1 Oct. 27, 2022

Related U.S. Application Data

(63) Continuation of application No. 17/102,019, filed on Nov. 23, 2020, now Pat. No. 11,403,885, which is a
(Continued)

(30) Foreign Application Priority Data

Jul. 21, 2017 (CN) .......................... 201710601348.X (51) Int. Cl.
*G08B 21/00* (2006.01)
*B60W 30/18* (2012.01)
(Continued)

(52) U.S. Cl.
CPC ..... *G07B 15/063* (2013.01); *B60W 30/18009* (2013.01); *G05D 1/0088* (2013.01);
(Continued)

(58) Field of Classification Search
CPC ................. G07B 15/063; G07B 15/06; B60W 30/18009; G05D 1/0088; G05D 1/0297;
(Continued)

(56) References Cited

U.S. PATENT DOCUMENTS 6,777,904 B1 8/2004 Degner
7,103,460 B1 9/2006 Breed
(Continued)

FOREIGN PATENT DOCUMENTS

CN 105023438 A 11/2015
CN 205334579 U 6/2016
(Continued)

OTHER PUBLICATIONS

Spinello, Luciano, et al., "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
(Continued)

*Primary Examiner* — Mark S Rushing
(74) *Attorney, Agent, or Firm* — Perkins Coie LLP (57) ABSTRACT

The application discloses a method and system of implementing a vehicle automatically passing through a barrier, a vehicle controller and a road barrier controller, so as to implement the automatic passing through of the road barrier of the unmanned vehicle. The method includes: controlling, by a vehicle controller, the vehicle to drive automatically and stop at a place of the road barrier; interacting, by the vehicle controller, with a road barrier controller correspond-
(Continued)

101 — A vehicle controller controls the vehicle to drive automatically and stop at a place of road barrier 102 — The vehicle controller interacts with a road barrier controller corresponding to the place of the road barrier to accomplish the vehicle automatically passing through the road barrier ing to the place of the road barrier to accomplish the automatic passing through of the road barrier.

20 Claims, 7 Drawing Sheets

Related U.S. Application Data continuation of application No. 16/035,661, filed on Jul. 15, 2018, now Pat. No. 10,846,945.

(51) Int. Cl.
    *G05D 1/00*           (2006.01)
    *G06V 20/54*         (2022.01)
    *G06V 20/58*         (2022.01)
    *G07B 15/06*         (2011.01)
    *G07C 5/00*          (2006.01)
    *G06V 20/62*         (2022.01)

(52) U.S. Cl.
    CPC ........... *G05D 1/0297* (2013.01); *G06V 20/54* (2022.01); *G06V 20/58* (2022.01); *G07C 5/008* (2013.01); *G05D 2201/0213* (2013.01); *G06V 20/625* (2022.01); *G06V 2201/08* (2022.01); *G07B 15/06* (2013.01)

(58) Field of Classification Search
    CPC ........... G05D 2201/0213; G06V 20/54; G06V 20/58; G06V 20/625; G06V 2201/08; G07C 5/008; G07C 9/32
    USPC ........................................... 340/928
    See application file for complete search history.

(56) References Cited

U.S. PATENT DOCUMENTS

| | | | |
|---|---|---|---|
| 7,783,403 B2 | 8/2010 | Breed | |
| 8,412,449 B2 | 4/2013 | Trepagnier | |
| 8,788,134 B1 | 7/2014 | Litkouhi | |
| 8,965,621 B1 | 2/2015 | Urmson | |
| 9,002,632 B1 | 4/2015 | Emigh | |
| 9,064,406 B1 | 6/2015 | Steven | |
| 9,111,444 B2 | 8/2015 | Kaganavich | |
| 9,134,402 B2 | 9/2015 | Sebastian | |
| 9,248,835 B2 | 2/2016 | Tanzmeiser | |
| 9,315,192 B1 | 4/2016 | Zhu | |
| 9,317,033 B2 | 4/2016 | Ibanez-Guzman | |
| 9,342,074 B2 | 5/2016 | Dolgov | |
| 9,399,397 B2 | 7/2016 | Mizutani | |
| 9,438,878 B2 | 9/2016 | Niebla | |
| 9,465,388 B1* | 10/2016 | Fairfield | G05D 1/0038 |
| 9,476,970 B1 | 10/2016 | Fairfield | |
| 9,535,423 B1 | 1/2017 | Debreczeni | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 2003/0101894 A1 | 6/2003 | Schwenker | |
| 2006/0200379 A1* | 9/2006 | Biet | G07B 15/063 705/13 |
| 2007/0009136 A1* | 1/2007 | Pawlenko | G08G 1/017 382/104 |
| 2008/0249667 A1 | 10/2008 | Horvitz | |
| 2009/0040054 A1 | 2/2009 | Wang | |
| 2010/0049397 A1 | 2/2010 | Lin | |
| 2013/0085483 A1 | 4/2013 | Rathjen | |
| 2014/0052367 A1* | 2/2014 | Hahne | G08G 1/161 701/119 |
| 2015/0360692 A1 | 12/2015 | Ferguson | |
| 2016/0293003 A1 | 10/2016 | Ng | |
| 2016/0321381 A1 | 11/2016 | English | |
| 2016/0360101 A1 | 12/2016 | Venetianer | |
| 2016/0375907 A1 | 12/2016 | Erban | |
| 2016/0379494 A1* | 12/2016 | Bhuiya | G05D 1/0291 701/117 |
| 2017/0046883 A1* | 2/2017 | Gordon | G06Q 50/30 |
| 2017/0227970 A1* | 8/2017 | Taguchi | G01S 19/485 |
| 2018/0024554 A1 | 1/2018 | Brady | |
| 2018/0335781 A1* | 11/2018 | Chase | G08G 1/0112 |

FOREIGN PATENT DOCUMENTS

| | | |
|---|---|---|
| CN | 106373428 A | 2/2017 |
| CN | 106781688 A | 5/2017 |

OTHER PUBLICATIONS

Barth, Matthew et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Ahn, Kyoungho et al., "The Effects of Route Choice Decisions on Vehicle Energy Consumption and Emissions", Virginia Tech Transportation Institute, Blacksburg, VA 24061, date unknown.

Ramos, Sebastian, et al., "Detecting Unexpected Obstacles for Self-Driving Cars: Fusing Deep Learning and Geometric Modeling", arXiv:1612.06573v1 [cs.CV] Dec. 20, 2016.

Schroff, Florian et al., (Google), "FaceNet: A Unified Embedding for Face Recognition and Clustering", CVPR 2015.

Dai, Jifeng et al., (Microsoft Research), "Instance-aware Semantic Segmentation via Multi-task Network Cascades", CVPR 2016.

Huval, Brody et al., "An Empirical Evaluation of Deep Learning on Highway Driving", arXiv:1504.01716v3 [cs.RO] Apr. 17, 2015.

Li, Tian, "Proposal Free Instance Segmentation Based on Instance-aware Metric", Department of Computer Science, Cranberry-Lemon University, Pittsburgh, PA., date unknown.

Norouzi, Mohammad et al., "Hamming Distance Metric Learning", Departments of Computer Science and Statistics, University of Toronto, date unknown.

Jain, Suyong Dutt et al., "Active Image Segmentation Propagation", In Proceedings of the IEEE Conference on Computer Vision and Pattern Recognition (CVPR), Las Vegas, Jun. 2016.

MacAodha, Oisin, et al., "Hierarchical Subquery Evaluation for Active Learning on a Graph", In Proceedings of the IEEE Conference on Computer Vision and Pattern Recognition (CVPR), 2014.

Kendall, Alex et al., "What Uncertainties Do We Need in Bayesian Deep Learning for Computer Vision", arXiv:1703.04977v1 [cs.CV] Mar. 15, 2017.

Wei, Junqing et al., "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Welinder, Peter et al., "The Multidimensional Wisdom of Crowds"; http://www.vision.caltech.edu/visipedia/papers/WelinderEtalNIPS10.pdf, 2010.

Yu, Kai et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

Guarneri, P. et al., "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

Yang, C., et al. "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Richter, Stephan R, et al., "Playing for Data: Ground Truth from Computer Games", Intel Labs, European Conference on Computer Vision (ECCV), Amsterdam, the Netherlands, 2016.

(56) References Cited

OTHER PUBLICATIONS

Athanasiadis, Thanos et al., "Semantic Image Segmentation and Object Labeling", IEEE Transactions on Circuits and Systems for Video Technology, vol. 17, No. 3, Mar. 2007.
Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, 2016.
Somani, Adhiraj et al., "DESPOT: Online POMDP Planning with Regularization", Department of Computer Science, National University of Singapore, date unknown.
Paszke, Adam et al., "Enet: A deep neural network architecture for real-time semantic segmentation." arXiv.org/abs/1606.02147. Submitted Jun. 7, 2016, pp. 1-10.
Chinese Application No. 201710601348.X First Office Action dated Jun. 29, 2018, pp. 1-32.
Chinese Application No. 201710601348.X Second Office Action dated Aug. 28, 2018, pp. 1-18.

* cited by examiner

METHOD, SYSTEM AND RELATED DEVICES FOR IMPLEMENTING VEHICLE AUTOMATICALLY PASSING THROUGH BARRIER

CROSS-REFERENCES TO RELATED APPLICATIONS

This application is a continuation of U.S. patent application Ser. No. 17/102,019, titled "METHOD, SYSTEM AND RELATED DEVICES FOR IMPLEMENTING VEHICLE AUTOMATICALLY PASSING THROUGH BARRIER," filed Nov. 23, 2020, which is a continuation of U.S. patent application Ser. No. 16/035,661, titled "METHOD, SYSTEM AND RELATED DEVICES FOR IMPLEMENTING VEHICLE AUTOMATICALLY PASSING THROUGH BARRIER," filed Jul. 15, 2018, issued as U.S. Pat. No. 10,846,945 on Nov. 24, 2020, which in turn claims the priority from Chinese Patent Application No. 201710601348.X, filed with the Chinese Patent Office on Jul. 21, 2017 and entitled "METHOD, SYSTEM AND RELATED DEVICES FOR IMPLEMENTING VEHICLE AUTOMATICALLY PASSING THROUGH BARRIER", the disclosures of which are hereby incorporated by reference in their entirety.

FIELD

The application relates to the autonomous driving field, and particularly to a method and a system for implementing a vehicle automatically passing through a barrier, a vehicle controller and a road barrier controller.

BACKGROUND

With the development of autonomous driving, autonomous vehicles will be more and more popular. Thus, how to implement autonomous vehicles automatic passing through barriers becomes an urgent problem to be solved by those skilled in the art. At present, there is no related disclosed technology of implementing autonomous vehicles automatically passing through barriers.

BRIEF SUMMARY

On an aspect, embodiments of the application provides a method for implementing a vehicle automatically passing through a road barrier, which includes:
controlling, by a vehicle controller, the vehicle to drive automatically and stop at the place of the road barrier; and
interacting, by the vehicle controller, with a road barrier controller corresponding to the place of the road barrier to accomplish the vehicle automatically passing through the road barrier.

On another aspect, embodiments of the application further provides a road barrier controller, located in a road barrier, which includes:
a communication unit configured to receive and send information; and
a road barrier control unit configured to obtain vehicle identification information of a vehicle, perform identity verification on the vehicle identification information, and control the road barrier to be released the vehicle when the verification succeeds.

On another aspect, embodiments of the application further provides a vehicle controller, located in a vehicle, which includes:

a communication unit configured to receive and send information; and
a control unit configured to control the vehicle to drive automatically and stop at the place of a road barrier, and interact with a road barrier controller corresponding to the place of the road barrier to accomplish the vehicle automatically passing through the road barrier.

An embodiment of the application further provides a system for implementing a vehicle automatically passing through a road barrier, which includes a vehicle controller and a road barrier controller:
the vehicle controller controls the vehicle to drive automatically and stop at a place of the road barrier; and interacts with the road barrier controller corresponding to the place of the road barrier to accomplish the vehicle automatically passing through the road barrier; and
the road barrier controller configured to obtain vehicle identification information of the vehicle, perform identity verification on the vehicle identification information, and control the road barrier to be released when the verification succeeds.

BRIEF DESCRIPTION OF THE DRAWINGS

The accompanying drawings are used to provide the further understanding of the application and constitute a part of the specification, and serve to explain the application together with the embodiments of the application but not limit the application.

DETAILED DESCRIPTION OF THE EMBODIMENTS

In order to make those skilled in the art better understand the technical solution in the application, the technical solution in the embodiments of the application will be described clearly and completely below in combination with the accompanying drawings in the embodiments of the application. Obviously the described embodiments are just a part of the embodiments of the application but not all the embodiments. Based upon the embodiments of the application, all of other embodiments obtained by those ordinary skilled in the art without creative work should pertain to the protection scope of the application.

In view of the problem that no scheme can achieve autonomous vehicles automatically passing through barriers in the prior art, the present application provides a method and system for implementing a vehicle automatically passing through a barrier, a vehicle controller and a road barrier controller, so as to address the problem in the prior art described above.

In the method and system of implementing a vehicle automatically passing through a barrier provided in the embodiments of the application, a road barrier controller is deployed at the place of each road barrier and it controls whether the road barrier is to be released; after a vehicle controller controlling the vehicle to drive automatically and stop at the place of a road barrier, the vehicle controller interacts with the road barrier controller deployed at the place of the road barrier to accomplish the vehicle automatically passing through the road barrier without artificial intervention, thereby the autonomous vehicle automatically passing through the road barrier could be achieved.

First Embodiment

Figure 1:
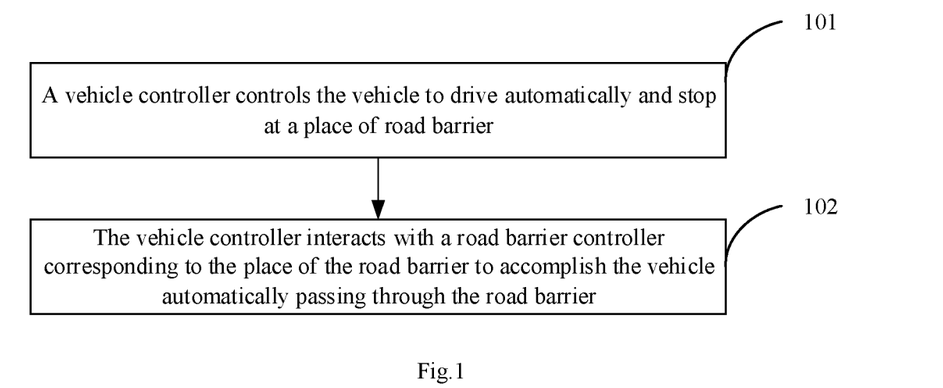
FIG. 1 is the first one of flow diagram of a method for implementing a vehicle automatically passing through a barrier in embodiments of the application.

Referring to FIG. 1 which is a flow chart of a method of implementing a vehicle automatically passing through a barrier provided by embodiments of the application, the method includes:

Step 101: a vehicle controller located in a vehicle controls the vehicle to drive automatically and stop at the place of a road barrier;

Step 102: the vehicle controller interacts with a road barrier controller corresponding to the place of the road barrier to accomplish the vehicle automatically passing through the road barrier.

The road barrier controller can communicate with the vehicle controller via a base station of cellular communication, Bluetooth, WIFI or the like, which is not limited strictly by the present application.

In embodiments of the application, the vehicle controller can be implemented as a DSP (Digital Signal Processor), FPGA (Field-Programmable Gate Array) controller, industrial computer, driving computer, ECU (Electronic Control Unit), or VCU (Vehicle Control Unit) or the like, which is not limited strictly by the present application.

In embodiments of the application, a road barrier and a corresponding road barrier controller are deployed at the place of each road barrier, where the road barrier controller controls the road barrier to be released or not to be released.

In embodiments of the application, the road barrier can be a road rod, electric retractable door or electric sliding door or the like; and the road barrier controller can electrically control the road barrier to be released or not to be released.

Figure 2:
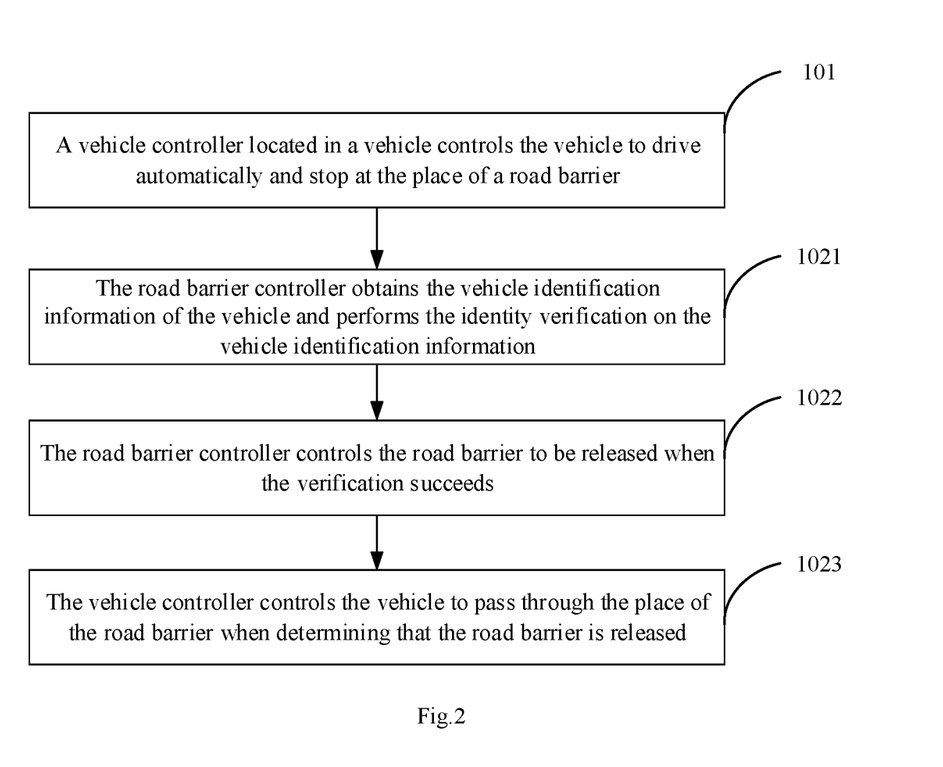
FIG. 2 is the second one of flow charts of a method of implementing vehicle automatically passing through a barrier in embodiments of the application.

In an embodiment of the application, the above step 102 can be implemented specifically as the following steps 1021 to 1022, as shown in FIG. 2:

Step 1021: the road barrier controller obtains the vehicle identification information of the vehicle and performs the identity verification on the vehicle identification information.

In an embodiment of the application, the process of the road barrier controller obtains the vehicle identification information of the vehicle described in the above step 1021 can be implemented specifically as but not limited to the following mode A1 or A2:

Mode A1: the road barrier controller identifies actively the vehicle identification information of the vehicle.

The mode A1 can be achieved specifically by but not limited to the following modes:

Mode A11: the road barrier controller controls a sensor to take an image of the vehicle, and performs image identification processing on the image to obtain the vehicle identification information of the vehicle.

The sensor can be a video camera which can be mounted nearly to the place of road barrier with the lens faces directly to the parking place, e.g., mounted just on the road barrier, on the road barrier controller, or on a fixed object nearly to the place of the road barrier. The angle of the lens of the video camera can be adjusted automatically.

According to the image posted back from the camera, the road barrier controller can perform the image processing on the image. When the vehicle identification information is identified from the image, the vehicle identification information is to be verified; when the vehicle identification information is not identified from the image, the shooting angle of the camera is adjusted automatically and the above actions are repeated until the vehicle identification information is identified.

The road barrier controller identifies the vehicle identification information from the image, which can be achieved specifically by the following way: the road barrier controller extracts features from the image, compares the extracted features with the features corresponding to the preset vehicle identification information, and determines the vehicle identification information according to the features compared successfully. In an embodiment of the application, the above vehicle identification information is the information associated only with the vehicle, for example, the vehicle identification information may be license plate number. When the vehicle identification information is the license plate number, the features corresponding to the vehicle identification information include size feature, shape (rectangular frame) feature, color (blue or black) feature, text features (length of the text string in the rectangular frame) and the like.

Mode A12: the road barrier controller controls the sensor to scan a two-dimensional code or bar code on the vehicle, to obtain the vehicle identification information of the vehicle.

In embodiments of the application, the two-dimensional code or bar code containing the vehicle identification information can be pasted or printed in advance on a specified place of the vehicle, such as the front windshield, or the left side of the vehicle.

The sensor can be a video camera which can be mounted nearly to the place of the road barrier with the lens just faces directly to the parking place, e.g., mounted just on the road barrier, on the road barrier controller, or on a fixed object nearly to the place of the road barrier. The angle of the lens of the video camera can be adjusted automatically.

The road barrier controller adjusts the shooting angle of the camera until the two-dimensional code or bar code is scanned successfully.

Mode A2: the road barrier controller receives the vehicle identification information of the vehicle from the vehicle controller. That is, the vehicle controller sends actively the vehicle identification information to the road barrier controller.

Step 1022: the road barrier controller controls the road barrier to be released when the verification succeeds.

In an embodiment of the application, the process of the road barrier controller performs the identity verification on the vehicle identification information described in the above step 1021, which can be achieved specifically by but not limited to any of the following modes (modes B1 to B3):

Mode B1: the vehicle identification information of the vehicles allowed to pass through is pre-stored in the road barrier controller, and the road barrier controller matches the obtained vehicle identification information with the pre-stored vehicle identification information of the vehicles allowed to pass through, and determines the verification is successful when the match succeeds.

Mode B2: the passing rules are pre-stored in the road barrier controller, and the road barrier controller judges whether the obtained vehicle identification information conforms to the passing rules, and if so, the verification is passed.

The passing rules can include but not limited to: the vehicle type conforms to the preset vehicle types, the license plate number belongs to some predetermined regions, or the vehicle identification information is the registered information or the like.

For example, the passing rules may include at least one of: when the type of the vehicle is car the vehicle is allowed to pass through, when the type of the vehicle is truck the vehicle is allowed to pass through, when the type of the vehicle is motor vehicle the vehicle is allowed to pass through, when the license plate number of the vehicle is local license plate number the vehicle is allowed to pass through, and when the license plate number is registered the vehicle is allowed to pass through, or the like. The above rules are only examples, and it is not exhaustive here.

Mode B3: the road barrier controller sends the obtained vehicle identification information to a server remotely, the server performs the identity verification on the vehicle identification information, and the road barrier controller receives the result of the identity verification on the vehicle identification information from the server.

In the mode B3, the mode based on which the server performing the identity verification on the vehicle identification information may be the mode B1 or B2, and a detailed description thereof will be omitted here.

Step 1023: the vehicle controller controls the vehicle to pass through the place of the road barrier when determining that the road barrier is released.

In an embodiment of the application, the process of the vehicle controller determines whether the road barrier is released described in the above step 1023, can be achieved specifically by but not limited to any of the following modes (modes C1 to C2):

Mode C1: the vehicle controller determines that the road barrier is released when receiving an indication for allowing to pass through from the road barrier controller.

Mode C2: the vehicle controller detects whether the road barrier is released via an on-board sensor of the vehicle, and determines that the road barrier is released when the releasing of the road barrier is detected.

In an example, the mode C2 can be achieved specifically as follows: the vehicle controller pre-stores the correspondence between road barrier types and released states, determines the type and the state of the road barrier by the image or point cloud data sent by the on-board sensor, matches the state with the released state corresponding to the road barrier type in the correspondence, and determines that the road barrier is released if the match succeeds.

For example, when the road barrier is a road rod, the corresponding released state is the lifted state of the road rod; when the road barrier is an electric retractable door, the corresponding released state is the retraction state of the electric retractable door; when the road barrier is an electric sliding door, the corresponding released state is the open state of the electric sliding door. The above is only an example, and it is not exhaustive here.

Figure 3:
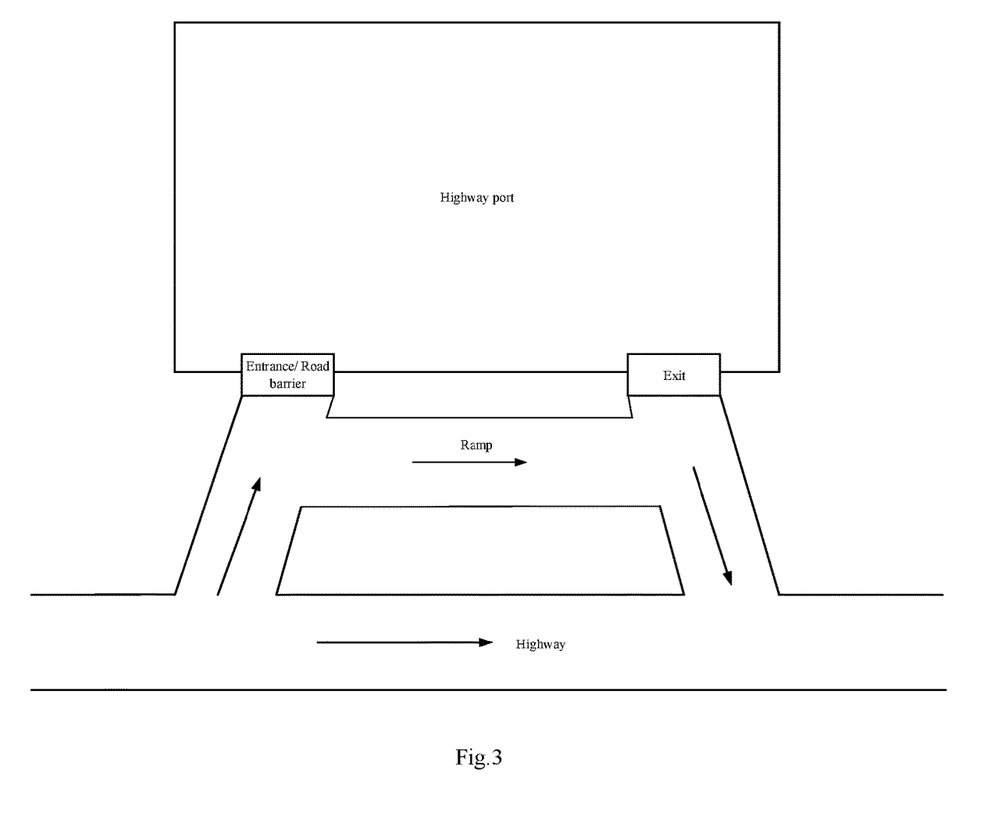
FIG. 3 is a schematic diagram of setting a ramp in a closed area such as a highway port in embodiments of the application.
Figure 4A:
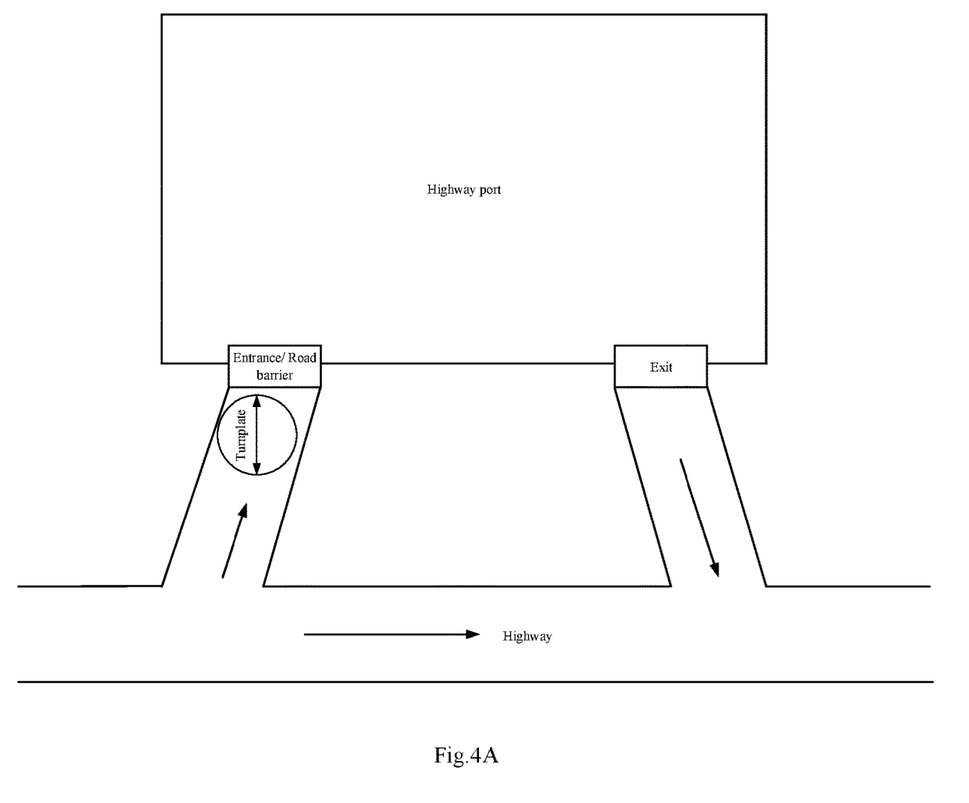
FIG. 4A is one of structural schematic diagrams of setting the place of the road barrier to be a turnplate in embodiments of the application.
Figure 4B:
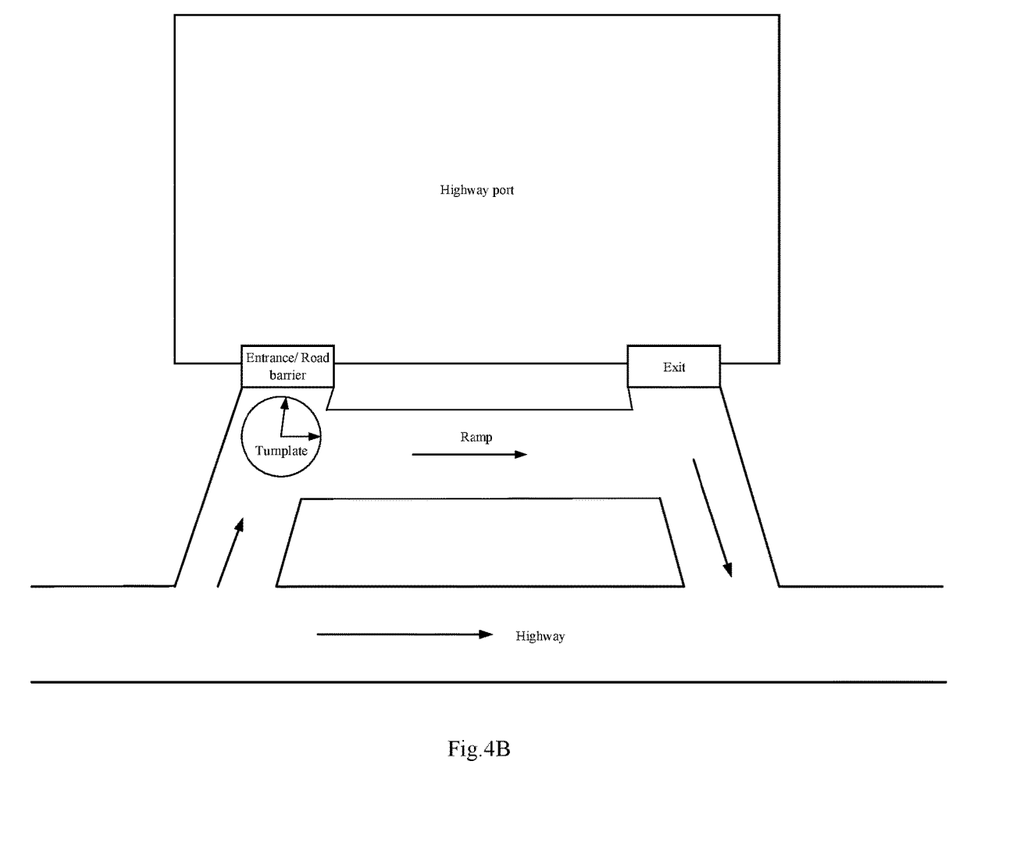
FIG. 4B is the second one of structural schematic diagrams of setting the place of road barrier to be a turnplate in embodiments of the application.

In some relatively closed areas (e.g., warehouses, goods collecting and distributing centers, highway ports, service areas, sea-front ports, logistics parks, railway stations, airports, factories), for the vehicle entered into the areas by mistake driving away quickly the area as soon as possible, ramps may be set around the places of road barriers. As shown in FIG. 3, a ramp is arranged between the entrance and the exit of the highway port; or the place of road barrier can be set to be a rotatable turnplate as shown in FIGS. 4A and 4B, where the turnplate can be rotated toward to two directions, one is the direction of passing through the place of the road barrier and another is the direction of leaving the place of the road barrier. As shown in FIG. 4A, the direction of leaving the place of the road barrier is opposite to the direction of passing through the road barrier, and as shown in FIG. 4B, the direction of leaving the place of the road barrier is the direction towards to the ramp.

Figure 5:
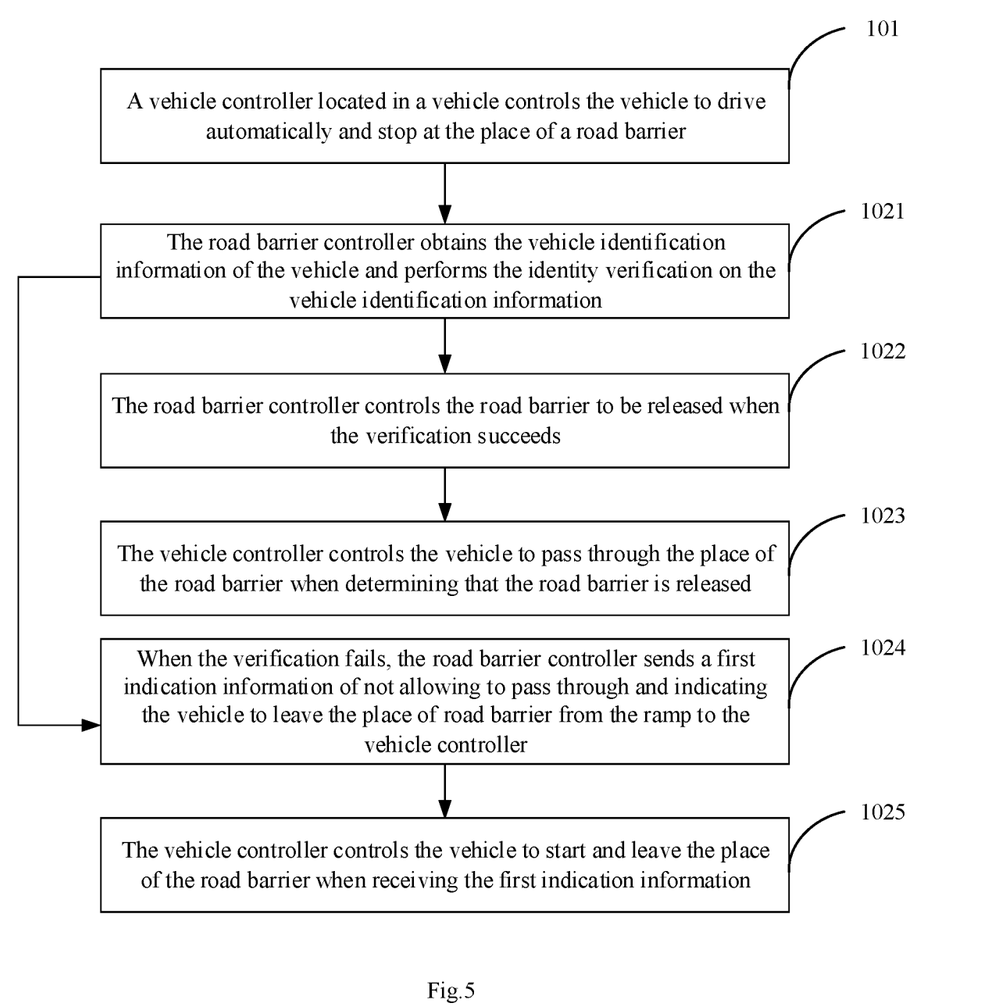
FIG. 5 is the third one of flow diagram of a method of implementing a vehicle automatically passing through a barrier in embodiments of the application.

When the ramp is set around the place of the road barrier, the method flow as shown in FIG. 2 described above can further includes the following steps 1024 to 1025, as shown in FIG. 5:

Step 1024: when the verification fails, the road barrier controller sends a first indication information of not allowing to pass through and indicating the vehicle to leave the place of road barrier from the ramp to the vehicle controller;

Step 1025: the vehicle controller controls the vehicle to start and leave the place of the road barrier when receiving the first indication information.

Figure 6:
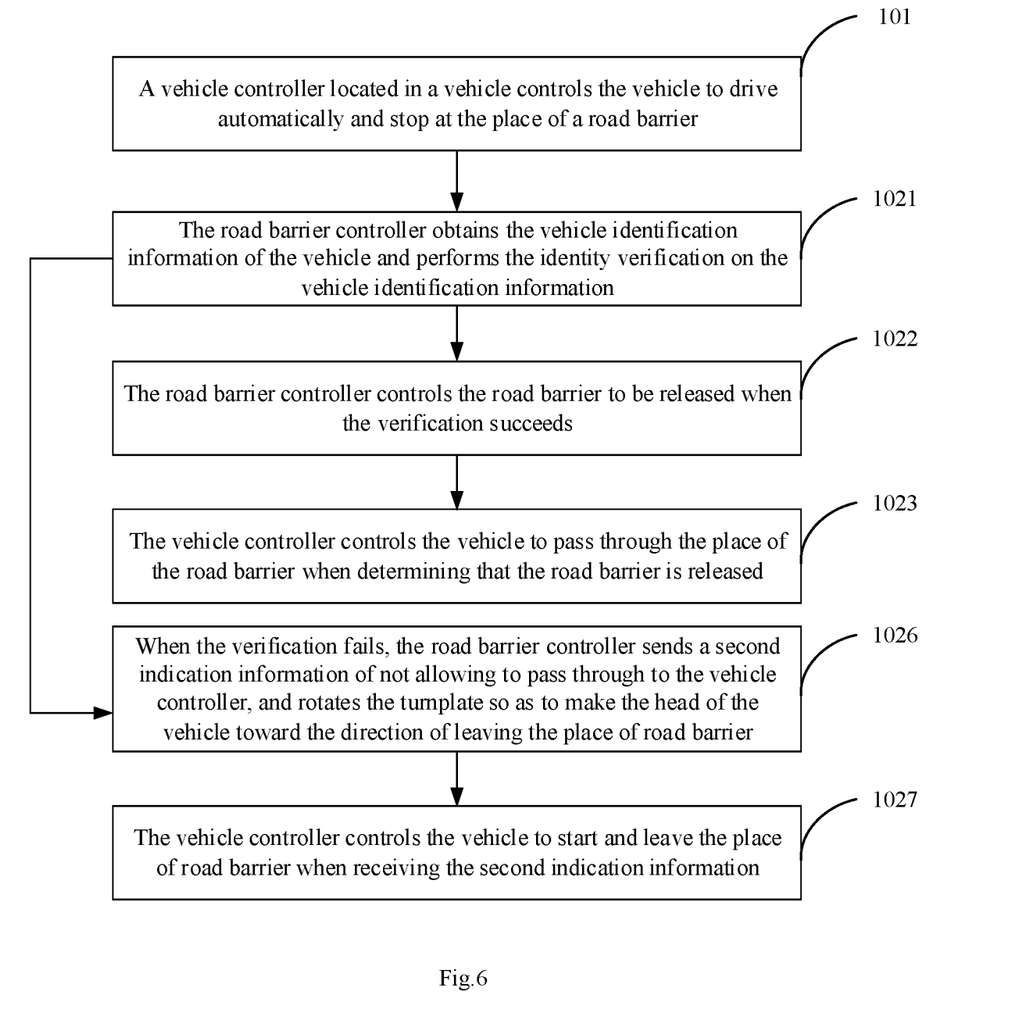
FIG. 6 is the fourth one of flow diagram of a method of implementing a vehicle automatically passing through a barrier in embodiments of the application.

When the place of the road barrier is set as the turnplate, the method flow as shown in FIG. 2 described above can further includes the following steps 1026 to 1027, as shown in FIG. 6:

Step 1026: when the verification fails, the road barrier controller sends a second indication information of not allowing to pass through to the vehicle controller, and rotates the turnplate so as to make the head of the vehicle toward the direction of leaving the place of road barrier;

Step 1027: the vehicle controller controls the vehicle to start and leave the place of road barrier when receiving the second indication information.

In an embodiment of the application, the vehicle controller controls the vehicle to drive automatically and stop at the place of the road barrier in the above step 101, which specifically includes:

the vehicle controller plans a path from the current place to the place of the road barrier, and controls the vehicle to drive automatically along the path;

the vehicle controller controls the vehicle to stop, when identifying an object presented in the front of the vehicle as a road barrier and the distance between the road barrier and the vehicle is less than or equal to the preset distance threshold, based on the image or point cloud data sent by an on-board sensor.

The vehicle controller can plan the path from the current place to the place of road barrier by using the on-board map software/navigation software.

The distance threshold may be an empirical value, or may be calculated according to the driving speed, the inertial measurement data or the like of the vehicle. That is, the distance threshold is the distance in which the vehicle drives from braking to stopping.

Second Embodiment

Figure 7:
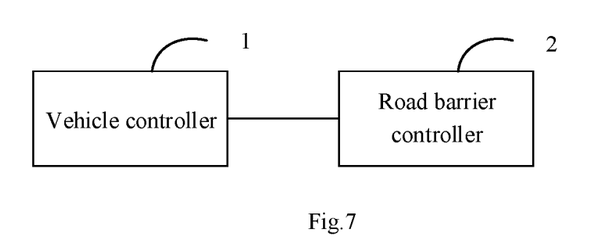
FIG. 7 is a structural schematic diagram of a system of implementing a vehicle automatically passing through a barrier in embodiments of the application.

Based upon the same concept of the method of implementing a vehicle automatically passing through a barrier provided in the first embodiment described above, the second embodiment of the application provides a system of implementing a vehicle automatically passing through a barrier. The structure of the system is illustrated in FIG. 7, which includes a vehicle controller 1 and a road barrier controller 2, where: the vehicle controller 1 controls the vehicle to drive automatically and stop at a place of a road barrier; and the vehicle controller 1 interacts with the road barrier controller 2 corresponding to the place of road barrier to accomplish the vehicle automatically passing through the barrier.

The road barrier controller 2 can communicate with the vehicle controller 1 via a base station of cellular communication, Bluetooth, WIFI or the like, which is not limited strictly by the present application.

In an embodiment of the application, the vehicle controller can be a DSP, FPGA controller, industrial computer, driving computer, ECU, or VCU or the like, which is not limited strictly by the present application.

In an embodiment of the application, the road barrier can be a road rod, electric retractable door or electric sliding door or the like; and the road barrier controller can electrically controls the road barrier to be released or not to be released.

The vehicle controller 1 interacts with the road barrier controller 2 corresponding to the place of the road barrier to accomplish the vehicle automatically passing through the road barrier, which specifically includes: the road barrier controller 2 obtains the vehicle identification information of the vehicle, performs the identity verification on the vehicle identification information, and controls the road barrier to be released when the verification succeeds; and the vehicle controller 1 controls the vehicle to start and pass through the place of the road barrier when determining that the road barrier is released.

The road barrier controller 2 obtains the vehicle identification information of the vehicle, which specifically includes: the road barrier controller 2 identifies the vehicle identification information of the vehicle; or the road barrier controller 2 receives the vehicle identification information of the vehicle from the vehicle controller 1.

The mode in which the road barrier controller 2 identifies the vehicle identification information of the vehicle can refer to the mode A11 or A12 in the first embodiment described above, and a detailed description thereof will be omitted here.

The vehicle controller 1 determines that the road barrier is released, which specifically includes: the vehicle controller 1 determines that the road barrier is released when receiving an indication allowing to pass through sent by the road barrier controller 2; or the vehicle controller 1 detects whether the road barrier is released via an on-board sensor, and determines that the road barrier is released when the releasing of the road barrier is detected.

The mode in which the vehicle controller 1 detects whether the road barrier is released via the on-board sensor can refer to the modes C1 to C2 in the first embodiment described above, and a detailed description thereof will be omitted here.

The mode in which the road barrier controller 2 performs the identity verification on the vehicle identification information can refer to the modes B1 to B3 in the first embodiment described above, and a detailed description thereof will be omitted here.

The road barrier controller 2 is further configured to send a first indication information of not allowing to pass through and indicating the vehicle to leave the place of road barrier through the ramp to the vehicle controller 1 when the verification fails; and the vehicle controller 1 is further configured to control the vehicle to start and leave the place of road barrier when receiving the first indication information.

The place of road barrier is set to be a rotatable turnplate; the road barrier controller 2 is further configured to send a second indication information of not allowing to pass through to the vehicle controller 1, and rotate the turnplate so as to make the head of the vehicle toward the direction of leaving the place of road barrier; and the vehicle controller 1 is further configured to control the vehicle to start and leave the place of road barrier when receiving the second indication information.

The vehicle controller 1 controls the vehicle to drive automatically and stop at the place of the road barrier, which specifically includes:
  the vehicle controller 1 plans a path from the current place to the place of road barrier, and controls the vehicle to drive automatically along the path;
  the vehicle controller 1 controls the vehicle to stop when identifying an object presented in the front of the vehicle as a road barrier and the distance between the road barrier and the vehicle is less than or equal to the preset distance threshold, based on the image or point cloud data sent by the on-board sensor.

Third Embodiment

Figure 8:
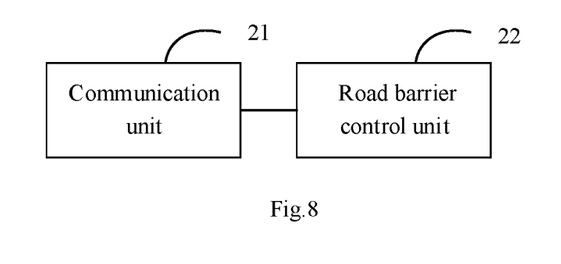
FIG. 8 is a structural schematic diagram of a road barrier controller in embodiments of the application.

Based upon the same concept of the method of implementing the vehicle automatically passing through the road barrier, the third embodiment of the application provides a road barrier controller. The structure of the road barrier controller is as shown in FIG. 8, which includes:
  a communication unit 21 configured to receive and send information;
  a road barrier control unit 22 configured to obtain vehicle identification information of a vehicle, perform identity verification on the vehicle identification information, and control a road barrier to be released when the verification succeeds.

The road barrier control unit 22 is further configured to: send an indication allowing to pass through by the communication unit 21 to a vehicle controller of the vehicle when the verification succeeds.

The road barrier control unit 22 obtains the vehicle identification information of the vehicle, which is specifically configured to:
  identify the vehicle identification information of the vehicle; or, receive the vehicle identification information of the vehicle by the communication unit 21 from the vehicle controller.

The road barrier control unit 22 identifies the vehicle identification information of the vehicle, which is specifically configured to: control a sensor to take an image of the vehicle, and perform image identification processing on an image to obtain the vehicle identification information of the vehicle; or, control the sensor to scan a two-dimensional code or bar code on the vehicle, to obtain the vehicle identification information of the vehicle.

The road barrier control unit 22 is further configured to: send a first indication information of not allowing to pass through and indicating the vehicle to leave the place of road barrier from a ramp by the communication unit 21 to the vehicle controller of the vehicle when the verification fails.

The place of road barrier is set to be a rotatable turnplate, and the road barrier control unit 22 is further configured to: send a second indication information of not allowing to pass through by the communication unit 21 to the vehicle controller, and rotate the turnplate so as to make the head of the vehicle toward the direction of leaving the place of road barrier when the verification fails.

Fourth Embodiment

Figure 9:
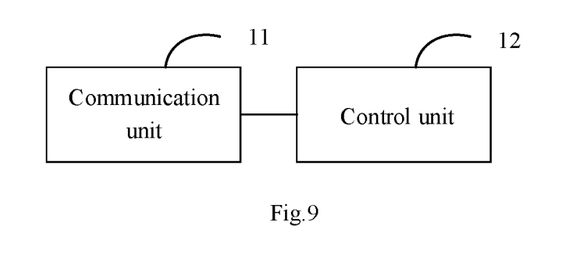
FIG. 9 is a structural schematic diagram of a vehicle controller in embodiments of the application.

Based upon the same concept of the method of implementing vehicle automatically passing through road barrier, the fourth embodiment of the application provides a vehicle controller. The structure of the vehicle controller is as shown in FIG. 9, which includes:

- a communication unit 11 configured to receive and send information;
- a control unit 12 configured to control a vehicle to drive automatically and stop at a place of a road barrier, and interact with a road barrier controller corresponding to the place of the road barrier to accomplish the vehicle automatically passing through the road barrier.

The control unit 12 interacts with the road barrier controller corresponding to the place of road barrier to accomplish the vehicle automatically passing through the road barrier, which specifically includes: the control unit 12 sends the vehicle identification information to the road barrier controller by the communication unit 11; and the control unit 12 controls the vehicle to start and pass through the place of road barrier when receiving by the communication unit 11 an indication allowing to pass through sent by the road barrier controller.

The control unit 12 interacts with the road barrier controller corresponding to the place of road barrier to accomplish the automatic passing through of the road barrier, which specifically includes: the control unit 12 detects whether the road barrier is released via an on-board sensor, and controls the vehicle to start and pass through the place of road barrier when detecting the releasing.

The control unit 12 detects whether the road barrier is released via the on-board sensor, which specifically includes:

- the control unit 12 determines that the road barrier is released when judging that the road barrier is in a released state by image or point cloud data sent by the on-board sensor.

The control unit 12 controls the vehicle to drive automatically and stop at the place of road barrier, which specifically includes:

- the control unit 12 plans a path from the current place to the place of road barrier, and controls the vehicle to drive automatically along the path; and the control unit 12 controls the vehicle to stop when identifying an object presented in the front of the vehicle as a road barrier and the distance between the road barrier and the vehicle is less than or equal to the preset distance threshold, based on the image or point cloud data sent by an on-board sensor.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the application without departing from the spirit and scope of the application. Thus the application is also intended to encompass these modifications and variations therein as long as these modifications and variations come into the scope of the claims of the application and their equivalents.

What is claimed is:
1. A method comprising:
controlling, by a vehicle controller, an autonomous vehicle to drive to a road barrier location, wherein the road barrier location is set to be a rotatable turnplate;

sending, by the vehicle controller, to a road barrier controller corresponding to the road barrier location vehicle identification information of the autonomous vehicle;

sending, by the road barrier controller to the autonomous vehicle, an indication information of not allowing the autonomous vehicle to pass through the road barrier location;

rotating, by the road barrier controller, the rotatable turnplate to make a head of the autonomous vehicle directed toward a direction leaving the road barrier location; and controlling, by the vehicle controller, the autonomous vehicle to leave the road barrier location.

2. The method of claim 1, further comprising:

performing, by the road barrier controller, identity verification on the vehicle identification information;

controlling, by the road barrier controller, a road barrier to be released in response to the verification being successful; and controlling, by the vehicle controller, the autonomous vehicle to pass through a place of the road barrier after determining that the road barrier is released.

3. The method of claim 1, further comprising obtaining, by the road barrier controller, the vehicle identification information of the autonomous vehicle, comprising:

identifying, by the road barrier controller, the vehicle identification information of the autonomous vehicle; or receiving, by the road barrier controller, the vehicle identification information of the autonomous vehicle from the vehicle controller.

4. The method of claim 3, wherein identifying, by the road barrier controller, the vehicle identification information of the autonomous vehicle, comprises:

controlling, by the road barrier controller, a sensor to take an image of the autonomous vehicle, and performing image identification processing on the image to obtain the vehicle identification information of the autonomous vehicle; or controlling, by the road barrier controller, the sensor to scan a two-dimensional code or bar code on the autonomous vehicle, to obtain the vehicle identification information of the vehicle.

5. The method of claim 2, further comprising determining, by the vehicle controller, that the road barrier is released, comprising:

determining, by the vehicle controller, that the road barrier is released in response to receiving an indication allowing the autonomous vehicle to pass through sent by the road barrier controller; or detecting, by the vehicle controller, whether the road barrier is released via an on-board sensor, and determining that the road barrier is released in response to the releasing of the road barrier being detected.

6. The method of claim 5, wherein detecting, by the vehicle controller, whether the road barrier is released via the on-board sensor, comprises determining, by the vehicle controller, that the road barrier is released in response to judging that the road barrier is in a released state based on data sent by the on-board sensor.

7. The method of claim 2, further comprises:

receiving, by the vehicle controller, the indication information of not allowing the autonomous vehicle to pass through and indicating the autonomous vehicle to leave the road barrier location through a ramp adjacent to the road barrier location, in response to the verification of the vehicle identification information being failed; and controlling, by the vehicle controller, the autonomous vehicle to leave the road barrier location via the ramp in response to receiving the indication information.

8. The method of claim 7, wherein:

the rotatable turnplate is rotated toward to two directions, one of which is the direction for passing through the road barrier location and another of which is the direction for leaving the road barrier location; and the direction for leaving the road barrier location is opposite to the direction for passing through the road barrier, or the direction for leaving the road barrier location is the direction towards to the ramp.

9. The method of claim 1, wherein controlling, by the vehicle controller, the autonomous vehicle to drive to the road barrier location, further comprises:

planning, by the vehicle controller, a path from a current place to the road barrier location, and controlling the autonomous vehicle to drive automatically along the path; and controlling the autonomous vehicle to stop in response to the vehicle controller identifying an object presented in front of the autonomous vehicle as a road barrier and a distance of the road barrier from the vehicle being less than or equal to a preset distance threshold, based on data sent by an on-board sensor.

10. The method of claim 2, wherein there is vehicle identification information of vehicles allowed to pass through pre-stored in the road barrier controller; and wherein the performing, by the road barrier controller, the identity verification on the autonomous vehicle identification information comprises:

matching the obtained vehicle identification information with the pre-stored vehicle identification information of the vehicles allowed to pass through; and determining the verification is successful in response to the match being successful.

11. The method of claim 2, wherein there are passing rules pre-stored in the road barrier controller, and the passing rules comprise at least one of: a vehicle type conforms to preset vehicle types, a license plate number belongs to a predetermined region, and the vehicle identification information is registered information; and wherein the performing, by the road barrier controller, the identity verification on the vehicle identification information comprises:

judging whether the obtained vehicle identification information conforms to the passing rules; and if so, determining the verification is successful.

12. The method of claim 4, wherein the two-dimensional code or bar code contains the vehicle identification information and is pasted or printed in advance on the autonomous vehicle.

13. A system, comprising:

a vehicle controller operatively in communication with a road barrier controller, and a turnplate at a road barrier location, wherein:

the vehicle controller controls an autonomous vehicle to drive at the road barrier location;

the vehicle controller interacts with the road barrier controller corresponding to the road barrier location to pass the autonomous vehicle through a road barrier;

the turnplate is rotated by the road barrier controller so as to make a head of the autonomous vehicle toward a direction leaving the road barrier location, in response to a verification of vehicle identification information being failed; and the vehicle controller further controls the autonomous vehicle to leave the road barrier location.

14. The system of claim 13, wherein:

the road barrier controller comprises a road barrier control unit configured to:
  obtain the vehicle identification information of the autonomous vehicle; and
  perform identify verification on the vehicle identification information;

the vehicle controller sends vehicle identification information of the autonomous vehicle to the road barrier controller;

the vehicle controller receives an indication information of not allowing the autonomous vehicle to pass through the road barrier from the road barrier controller; and the vehicle controller controls the autonomous vehicle to leave the road barrier location in response to receiving the indication information of not allowing the autonomous vehicle to pass through the road barrier.

15. A road barrier controller, comprising:

the road barrier controller configured to interact with a vehicle controller controlling an autonomous vehicle at a road barrier location to pass the autonomous vehicle through a road barrier,
  wherein the road barrier controller corresponds to the road barrier location, and
  wherein the road barrier location is set to be a rotatable turnplate; and the road barrier controller configured to rotate the rotatable turnplate so as to make a head of the autonomous vehicle toward a direction leaving the road barrier location in response to a failure of a verification of vehicle identification information of the autonomous vehicle.

16. The road barrier controller of claim 15, wherein the road barrier controller comprises a road barrier control unit, configured to:

obtain the vehicle identification information of the autonomous vehicle; and perform identify verification on the vehicle identification information, wherein the road barrier controller sends an indication information of not allowing the autonomous vehicle to pass through the road barrier.

17. The road barrier controller of claim 16, wherein the road barrier control unit is further configured to:

control the road barrier to be released and send an indication allowing the autonomous vehicle to pass through the road barrier to the vehicle controller of the autonomous vehicle in response to the verification being successful.

18. The road barrier controller of claim 16, wherein the road barrier control unit configured to obtain the vehicle identification information of the autonomous vehicle is further configured to:

identify the vehicle identification information of the autonomous vehicle; or receive the vehicle identification information of the autonomous vehicle by a communication unit from the vehicle controller.

19. The road barrier controller of claim 18, wherein the road barrier control unit is further configured to:

control a sensor to take an image of the autonomous vehicle, and perform image identification processing on the image to obtain the vehicle identification information of the autonomous vehicle; or control the sensor to scan a two-dimensional code or bar code on the autonomous vehicle to obtain the vehicle identification information of the autonomous vehicle.

20. The road barrier controller of claim 16, wherein the road barrier control unit is further configured to:

send the indication information of not allowing the autonomous vehicle to pass through and indicating the autonomous vehicle to leave the road barrier location via a ramp, in response to the verification of the vehicle identification information being failed.

* * * * *